United States Patent [19]

Anderson

[11] 4,417,286
[45] Nov. 22, 1983

[54] DATA WINDOW EXPANDER CIRCUIT IN A DATA RECOVERY SYSTEM

[75] Inventor: Douglas B. Anderson, Escondido, Calif.

[73] Assignee: NCR Corporation, Dayton, Ohio

[21] Appl. No.: 288,850

[22] Filed: Jul. 31, 1981

[51] Int. Cl.³ ............................................. G11B 5/09
[52] U.S. Cl. .................................................. 360/51
[58] Field of Search .................... 360/51, 39, 40, 41

[56] References Cited

U.S. PATENT DOCUMENTS

| 3,382,492 | 5/1968 | Santzna | 360/51 |
| 3,636,536 | 1/1972 | Norris | 360/51 |

Primary Examiner—Vincent P. Canney

Attorney, Agent, or Firm—J. T. Cavender; Edward Dugas; Stephen F. Jewett

[57] ABSTRACT

A data recovery system for use in recovering data encoded in a double frequency code on a magnetic disc device includes a data window expander circuit. The data recovery system recovers both separated data and separated clock signals. The separated data signal has a data window which occurs during the second half of each bit cycle of the separated data signal. The data window expander circuit expands the data window, and includes flip-flops for delaying the separated data signal and an OR gate for logically ORing the delayed separated data signal with the undelayed separated data signal. The output of the OR gate is the separated data signal having an expanded data window, which can then be synchronized, with minimal alignment errors, by the separated clock signal.

7 Claims, 16 Drawing Figures

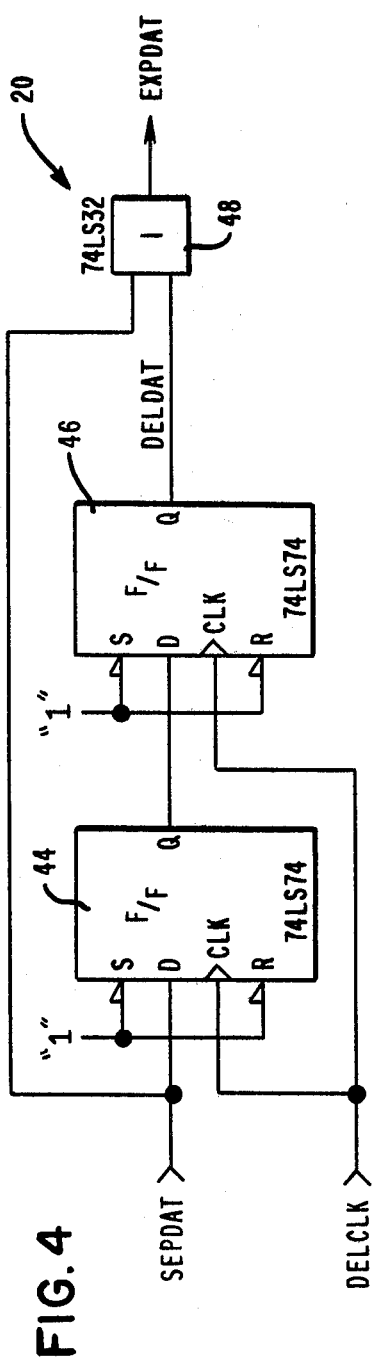
FIG. 4
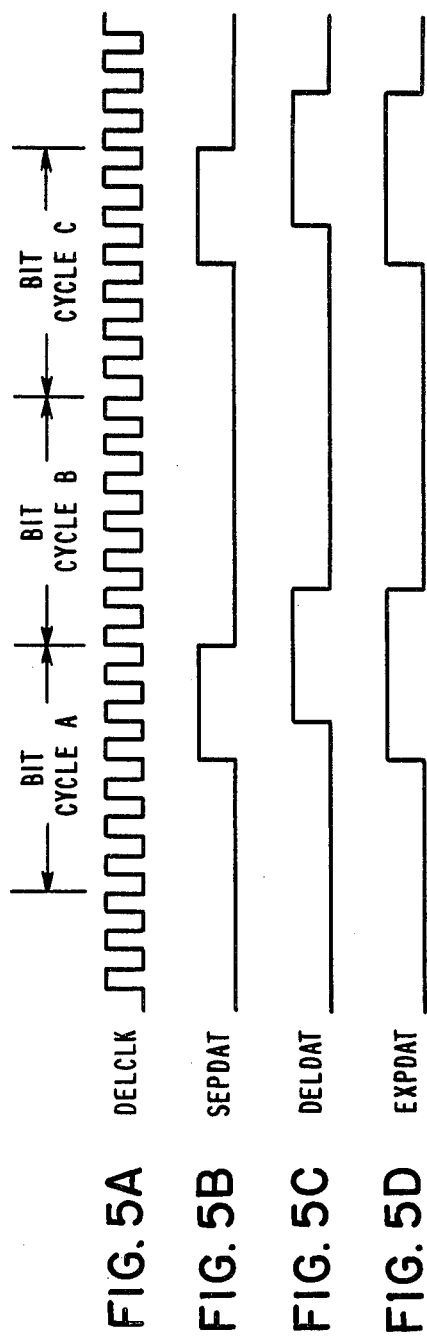
FIG. 5A DELCLK
FIG. 5B SEPDAT
FIG. 5C DELDAT
FIG. 5D EXPDAT

DATA WINDOW EXPANDER CIRCUIT IN A DATA RECOVERY SYSTEM

BACKGROUND OF THE INVENTION

The present invention relates to data recovery systems and, more particularly, to circuitry for reducing errors in data recovered from a double frequency encoded signal.

Data recovery systems, including such systems for use in recovering data from mass storage devices, are well-known in the art. Mass storage devices may use magnetic tapes or discs upon which data is stored in the form of magnetic pulses. To permit the storage of data on such tapes or discs, techniques such as double frequency encoding are employed. In double frequency encoding, as well as in many other conventional encoding techniques, the magnetic pulses recorded as a signal on the magnetic medium represent both data information and synchronizing or clocking information. Accordingly, when data is to be stored, a data signal and a clocking signal are encoded together into a single signal on the medium. When data is retrieved, the encoded signal must be decoded into recovered data and clocking signals, and then the data signal properly synchronized with the clocking signal.

While many commercially available mass memory or storage units can rapidly encode and store data and clocking information, and then retrieve the data and decode it when the data is needed by a data processing system, difficulties will occasionally result from errors occurring during the synchronizing of the recovered data signal with the recovered clocking signal.

For example, in the Model No. 9427H ten-mega-byte cartridge disc drive sold by Magnetic Peripherals Inc., Oklahoma City, Okla., when data is retrieved from a magnetic disc it is provided in the form of a separated data signal that represents the values of the data stored on the disc and in the form of a separated clock or clocking signal that is used to synchronize the separated data signal. Since the data on the magnetic disc is encoded in a double frequency code, the resulting separated data signal will normally represent data only in the second half of each bit cycle of the recovered signal. The second half of each bit cycle is often referred to as the "data window" or "data window portion" of the bit cycle. If the separated clock signal is slightly out of phase, it may synchronize the separated data signal at a time other than during the data window of one of the bit cycles, and result in an error in the recovered data.

There has arisen, therefore, the need for a data recovery system in which data errors will not occur as a result of the separated clock signal being misaligned with the data window of the separated data signal.

SUMMARY OF THE INVENTION

There is provided, in accordance with the present invention, a data recovery system for use in recovering data from an encoded signal that is stored, for example, on a magnetic medium such as a magnetic disc. In particular, the data recovery system in accordance with the present invention includes a data window expanding circuit for expanding the data window portion of each bit cycle of the data signal that is recovered or separated from the encoded signal.

The data recovery system in the described preferred embodiment receives a double frequency encoded signal and includes clock recovering means, in the form of a phase-locked oscillator, and data recovery means, in the form of a data discriminator circuit. The phase-locked oscillator provides a separated or recovered clock signal from the encoded signal and the data discriminator circuit provides a separated or recovered data signal from the encoded signal. The separated data signal represents one of two binary values during each bit cycle. In particular, the second half of each bit cycle (the data window) is at one signal level in order to represent one binary value, and is at a second signal level in order to represent the other binary value. Data window expanding means, in the form of flip-flops for delaying the separated data signal and a logic OR gate for logically ORing the separated data signal and the delayed separated data signal, provides a data signal having an expanded data window so that the separated clock signal will be less likely to have a clocking transition for synchronizing the data signal at a time other than during the data window.

It is, therefore, an object of the present invention to provide an improved data recovery system.

It is another object of the present invention to provide a data recovery system where the recovered data is less likely to have errors resulting from misalignment of recovered data and recovered clocking signals.

It is still another object of the present invention to provide a data recovery system for use with a magnetic storage device wherein the data is stored as a double frequency encoded signal in the storage device and, when the data is recovered, errors resulting from misalignment of recovered data and recovered clocking signals will not occur.

These and other objects of the present invention will become more apparent when taken in conjunction with the following description and the attached drawings.

BRIEF DESCRIPTION OF THE DRAWINGS

FIG. 4 is a circuit diagram of the data window expander circuit in the data recovery system of FIG. 1.

FIGS. 5A through 5D show waveforms illustrating the operation of the data window expander circuit of FIG. 4.

DETAILED DESCRIPTION OF THE PREFERRED EMBODIMENT

Figure 1:
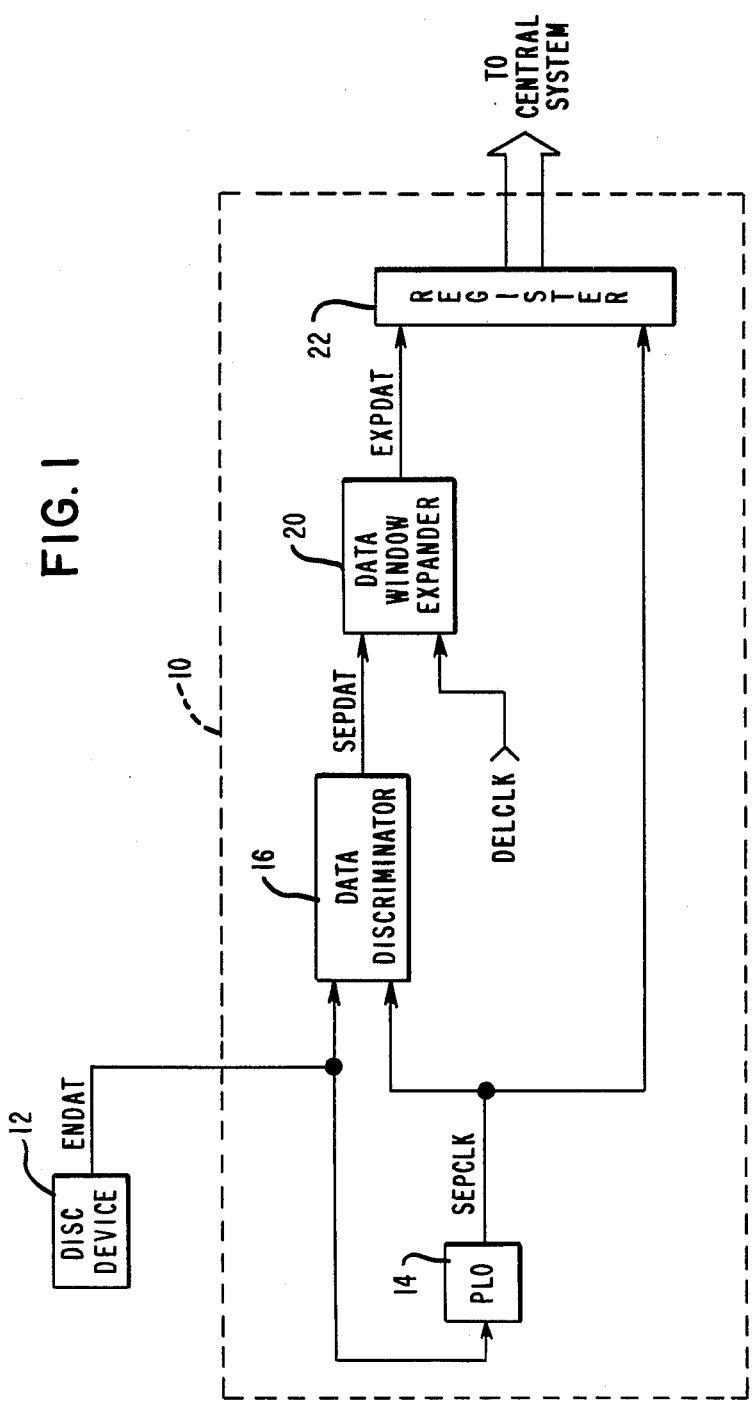
FIG. 1 is a block diagram illustrating a data recovery system in accordance with the present invention.

Referring now to FIG. 1, there is shown a data recovery system 10, in accordance with the present invention, for recovering data and clocking signals from a conventional magnetic disc device 12. It is assumed for purposes of the present description that data and clocking signals have been encoded on the magnetic medium of the disc device 12 in the form of a double frequency code, using any one of many well known techniques for such encoding. Although the nature of a double frequency encoded signal will be described later in conjunction with FIG. 3A, the present invention is concerned with neither such encoding nor the operation of the disc device 12, but rather the recovery of data and clocking information from the encoded signal stored in the disc device.

When data is to be recovered from the disc device 12, the data recovery system 10 receives a double frequency encoded data signal ENDAT that represents data stored in the disc device. The system 10 includes a conventional phase-locked oscillator (PLO) 14 for receiving the signal ENDAT and providing a separated clocking signal SEPCLK that is separated or recovered from the encoded signal ENDAT. In addition, the data recovery system 10 includes a data discriminator circuit 16 for receiving the encoded signal ENDAT from the disc device 12 and the separated clock signal SEPCLK from the PLO 14. The data discriminator circuit 16, in turn, provides a separated data signal SEPDAT that represents data recovered from the encoded signal ENDAT. The disc device 12, phase-locked oscillator 14, and data discriminator 16 are all well-known in the art and can all be found together in commercially available magnetic disc units, such as the previously-mentioned Model No. 9427H disc drive available from Magnetic Peripherals Inc. In such a commercially available unit, the disc device 12 would include, in addition to magnetic discs, suitable disc platters, a drive motor, a magnetic pickup coil, and power supply circuits. As conventional, the phase-locked oscillator 14 includes an internal oscillator (not shown) that is tuned in advance to a frequency that approximates the frequency with which the encoded data stored in the disc device 12 is synchronized or clocked, and provides the clocking signal SEPCLK in response to the received encoded signal ENDAT, with the clock signal SEPCLK having the exact frequency that was used in encoding the data stored in the disc device 12.

The data recovery system 10 further includes, as specifically provided for in accordance with the present invention and shown in FIG. 1, a data window expander circuit 20. The data window expander circuit 20 will be described later in conjunction with FIGS. 4 and 5A–5D. However, briefly, the data window expander circuit 20 receives the separated data signal SEPDAT from the data discriminator circuit 16 and an externally generated delay clocking signal DELCLK having a frequency chosen to be at least several times that of SEPCLK, and provides, at its output, a signal EXPDAT. The signal EXPDAT represents the recovered or separated data signal SEPDAT, but having an expanded data window in order to permit proper alignment and synchronizing of the recovered data and clocking signals with minimal errors. The data signal EXPDAT is provided to a serial-in-parallel-out register 22, along with the separated clock signal SEPCLK, in order to permit the recovered data to be transferred from the recovery system 10 as a parallel byte of information. The data in the register 22 is transferred to a central data processing system (not shown) that may have requested the data from the disc device 12.

Figure 2:
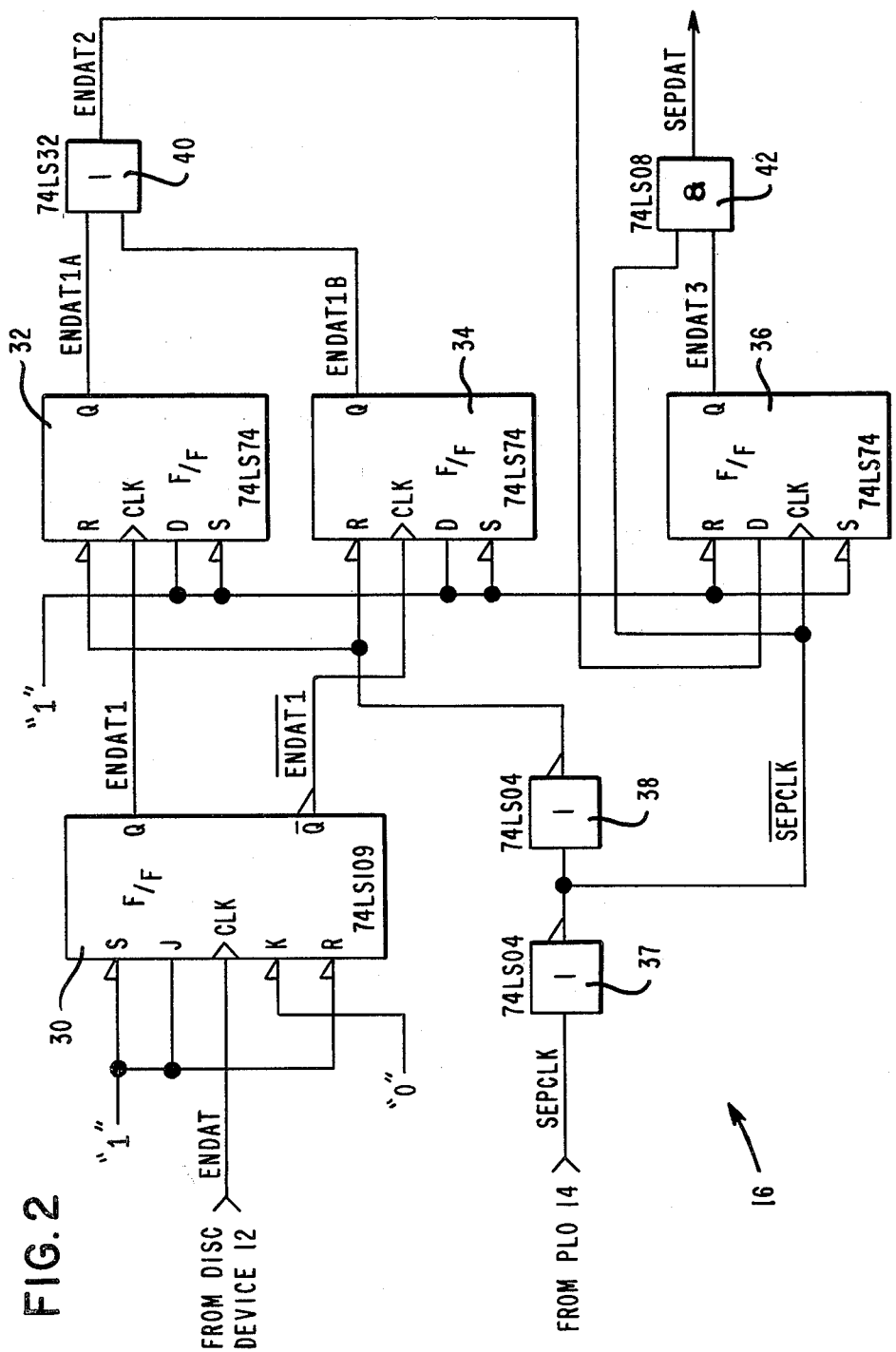
FIG. 2 is a circuit diagram of the data discriminator circuit in the data recovery system of FIG. 1.

Before proceeding with the description of the data window expander circuit 20, which will be done in conjunction with FIG. 4 and FIGS. 5A through 5D, the environment of the present invention will first be described with reference to FIG. 2 and FIGS. 3A through 3I. In particular, FIG. 2 shows, in exemplary form, circuitry within the data discriminator circuit 16 for recovering the signal SEPDAT. FIGS. 3A through 3I show waveforms illustrating the encoded signal ENDAT (and five of its bit cycles "A" through "E") from the disc device 12, the separated clock signal SEPCLK provided by the phase-locked oscillator 14, signals ENDAT1, $\overline{\text{ENDAT1}}$, ENDAT1A, ENDAT1B, ENDAT2 and ENDAT3 that are generated within the data discriminator circuit 16, and the separated data signal SEPDAT (and four of its bit cycles "A" through "D").

The data discriminator circuit 16 is seen in FIG. 2 as including a J-K flip-flop 30, first, second and third D-type flip-flops 32, 34 and 36, respectively, inverters 37 and 38, an OR gate 40, and an AND gate 42. The J-K flip-flop 30 receives the encoded data signal ENDAT at its clock input CLK. The signal ENDAT (FIG. 3A) is a conventional double frequency encoded signal, where at the beginning of each bit cycle there is a pulse "C" representing the clocking or synchronizing portion of the signal and a pulse at the midpoint of any bit cycle that represents a bit of data having a binary "1" value (Bit Cycles A, C, and E in FIG. 3A). The absence of a pulse at the midpoint of any bit cycle indicates that that bit cycle represents a bit of data having a binary "0" value (Bit Cycles B and D in FIG. 3A). The K input of the flip-flop 30 (FIG. 2) is connected for receiving a low or "0" logic level signal, and the J input, the set input S and the reset input R of the flip-flop 30 are all connected for receiving a high or "1" logic level signal. The flip-flop 30 toggles or changes state at its outputs Q and $\overline{\text{Q}}$ each time a pulse occurs in the signal ENDAT. The resulting signals ENDAT1 (FIG. 3B) and $\overline{\text{ENDAT1}}$ (FIG. 3C) at the outputs Q and $\overline{\text{Q}}$, respectively, of flip-flop 30 are provided to the clocking inputs CLK of the flip-flops 32 and 34, respectively. As can be noted from FIGS. 3B and 3C, the signals ENDAT1 and $\overline{\text{ENDAT1}}$ have a transition corresponding to the pulses at the beginning of each bit cycle of the signal ENDAT and a transition corresponding to the pulse at the midpoint of any bit cycle of the signal ENDAT that represents a "1".

Figure 3:
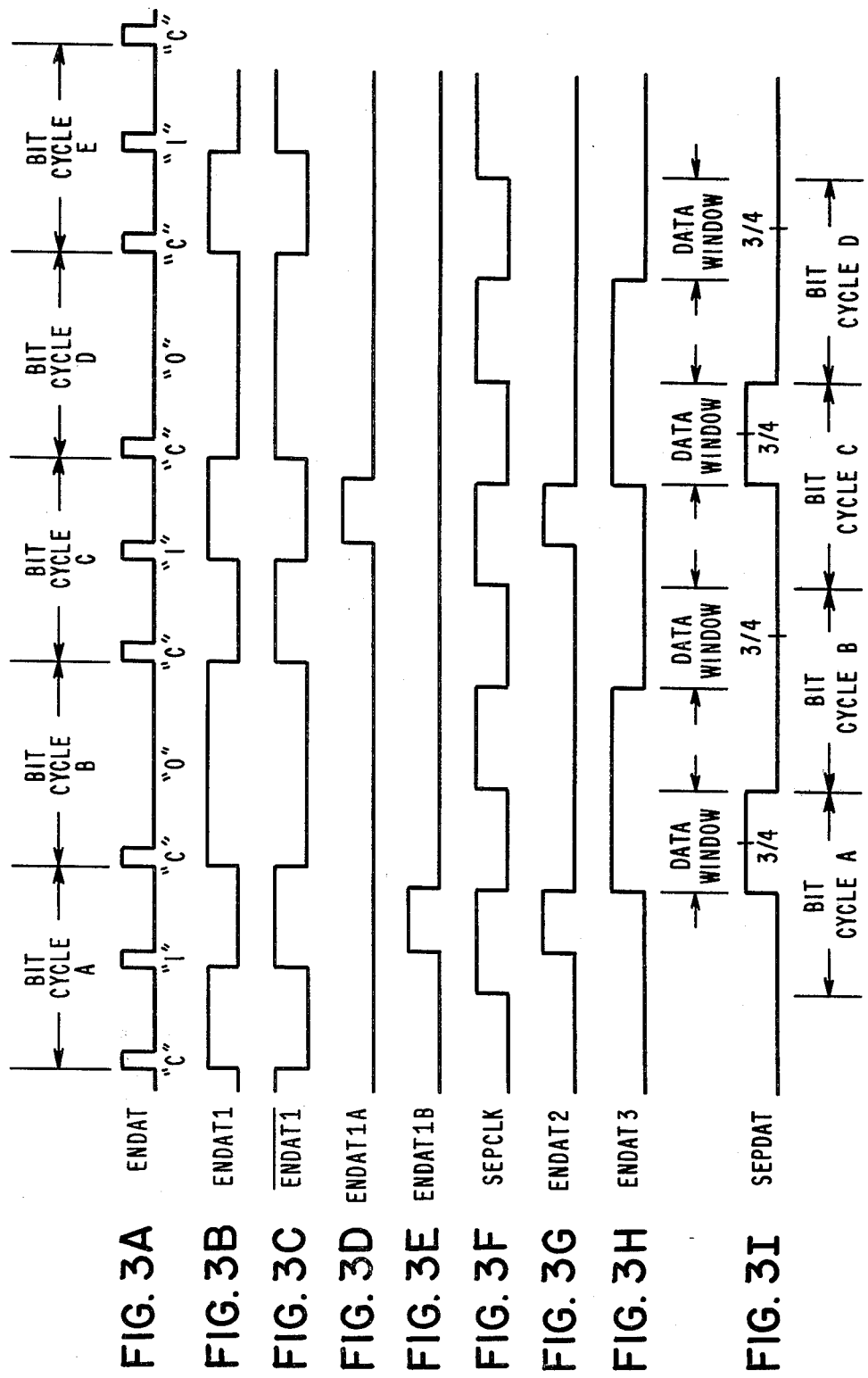
FIGS. 3A through 3I show waveforms illustrating the operation of the data discriminator circuit of FIG. 2.

The flip-flops 32 and 34 have their data inputs D and their set inputs S connected for receiving a high or "1" logic level signal and have their reset inputs R connected for receiving the separated clock signal SEPCLK (FIG. 3F) by way of the inverters 37 and 38. The signals ENDAT1A (FIG. 3D) and ENDAT1B (FIG. 3E) are provided at the data outputs Q of the flip-flops 32 and 34, respectively. As seen in FIGS. 3D and 3E, one of the signals ENDAT1A and ENDAT1B goes high when there is a transition at the midpoint of any bit cycle of the signal ENDAT1 representing a "1". In the particular case shown in the drawings, the signal ENDAT1B goes high in response to the first midpoint transition of the signal ENDAT1 during Bit Cycle A, with the signal ENDAT1B staying high until reset by the separated clock signal SEPCLK going low. The signal ENDAT1A, on the other hand, goes high when the midpoint transition of the signal ENDAT1 occurs during Bit Cycle C. The signals ENDAT1A and ENDAT1B are provided to the OR gate 40, with the output of the OR gate 40 providing the signal ENDAT2 that is illustrated in FIG. 3G. The signal ENDAT2 is provided to the data input D of the flip-flop 36. The clock input of flip-flop 36 receives the inverted separated clock signal $\overline{\text{SEPCLK}}$ from the PLO 14 (FIG. 1) by way of inverter 37 and the set input S and the reset input R of flip-flop 36 both receive a high or "1" logic level signal.

The high logic level pulses of the signal ENDAT2 at the output of the OR gate 40 are latched into the flip-flop 36. The signal ENDAT3 (FIG. 3H) at the output Q of flip-flop 36 and the inverted separated clock signal $\overline{\text{SEPCLK}}$ from inverter 37 are provided to the AND gate 42. The output of the AND gate 42, which is the separated data signal SEPDAT (FIG. 3I), is at a "1" for a half bit cycle corresponding to the second half of each bit cycle of the encoded signal ENDAT that represents a "1". During the first half of each bit cycle and during the second half of those bit cycles that represent "0's", the signal SEPDAT is at a "0", as seen in FIG. 3I. The bit cycles of SEPDAT identified as Bit Cycle A through Bit Cycle D in FIG. 3I correspond to the similarly identified bit cycles of ENDAT in FIG. 3A.

As mentioned earlier, systems in the past have encountered errors in recovered data due to the misalignment of the separated clock signal (SEPCLK) and the separated data signal (SEPDAT). For example, if such prior systems employed a register such as the register 22 in FIG. 1, the misalignment resulted in erroneous data values being clocked or latched into the register. Looking at FIGS. 3F and 3I, it should be apparent that in order for the positive edge of the separated clock signal SEPCLK to clearly occur during the data window of each bit cycle of the separated data signal SEPDAT, it would seem necessary for either the signal SEPCLK or the signal SEPDAT to be delayed. In the past, it has been common to delay one of these signals so that the positive going edges of the separated clock signal SEPCLK occurred as closely as possible at the middle of each data window, i.e., at the three-quarter bit position (indicated by the symbol "¾" in FIG. 3I) of each bit cycle. At extremely high frequencies, this has sometimes been extremely difficult to accomplish and, even if done, the occurrence of unintentional delays in either the clock or data signals has resulted in the positive going edge of the clocking signal occasionally drifting away from the data window.

The data window expander circuit 20 that is illustrated in FIG. 1, and that is shown in detail in FIG. 4, overcomes these problems. The data window expander circuit 20 is seen in FIG. 4 as including two D-type flip-flops 44 and 46, and an OR gate 48. The flip-flops 44 and 46 serve as a means for delaying the separated data signal SEPDAT, which is received at the data input D of the flip-flop 44 from the data discriminator circuit 16 (FIG. 1). The signal SEPDAT is illustrated, for convenience, in FIG. 5B. The output Q of the flip-flop 44 is provided to the input D of flip-flop 46, and both flip-flops 44 and 46 are clocked by the delay clocking signal DELCLK, which is illustrated in FIG. 5A. The output Q of the flip-flop 46 is a delayed data signal DELDAT, which is simply the separated data signal SEPDAT delayed by the amount of time it takes to clock the separated data signal SEPDAT through the flip-flops 44 and 46. The signal DELDAT is illustrated in FIG. 5C.

The delayed separated data signal DELDAT and the undelayed separated data signal SEPDAT are both provided to the OR gate 48, with the output of the OR gate 48 providing a recovered or separated data signal EXPDAT that has an expanded data window. The signal EXPDAT is illustrated in FIG. 5D.

It should be appreciated from the foregoing, especially the description of the data window expander circuit 20 in FIG. 4 and the waveforms seen in FIGS. 5A-5D, that the expansion of the data window in each bit cycle of the separated data signal SEPDAT substantially reduces the likelihood of misalignment of the separated data and separated clocking signals. As can be seen in FIG. 5D, the recovered data signal having the expanded data window provides a greater portion of each bit cycle during which the signal level of the recovered data signal representing a data value can be clocked into the register 22 that is seen in FIG. 1. The amount by which the data window is expanded is, of course, a function of the amount of delay that is accomplished by the flip-flops 44 and 46 in FIG. 4. In the preferred embodiment, where each bit cycle of the encoded data (and the cycle time of SEPCLK) is approximately 400 nanoseconds, it has been found that a delay clocking signal having a cycle time of 62 nanoseconds for clocking the flip-flops 44 and 46 will provide a recovered data signal having an expanded window that may be clocked into the register 22 with minimal alignment problems.

Of course, the amount by which the data window is expanded can be varied by changing the frequency of the delay clock DELCLK or by changing the number of flip-flops used to delay the separated data signal in the data window expander circuit 20. However, the amount by which the separated data signal SEPDAT is delayed to provide the signal DELDAT, which is also the amount by which the data window of the signal EXPDAT is expanded, should be less than one-half of the bit cycle of the separated data signal, in order to prevent the expanded data window of any bit cycle from distorting the data window of the next bit cycle.

Although the presently preferred embodiment of the present invention has been described, it will be understood that within the purview of the present invention various changes may be made within the scope of the appended claims.

I claim:

1. In a data recovery system for recovering a separated data signal and a separated clock signal from an encoded data signal, where each bit cycle of the separated data signal has a data window portion for indicating the data value of that bit cycle, the improvement comprising:

a data window expander circuit for expanding the data window portion of each bit cycle, said data window expander circuit including delay means for delaying the separated data signal and logic gate means for logically combining the separated data signal and the delayed separated data signal in order to provide a recovered data signal having an expanded data window portion.

2. The improvement of claim 2, wherein said delay means comprises a flip-flop circuit for receiving the separated data signal and clocked by a delay clocking signal having a frequency greater than the separated clocking signal, wherein the output of said flip-flop circuit provides the delayed separated data signal, and wherein said logic gate means comprises an OR gate.

3. The improvement of claim 2, wherein said flip-flop circuit includes two D-type flip-flops, with one of said D-type flip-flops having a data input connected for receiving the separated data signal and an output connected to the data input of the other of said D-type flip-flops, and wherein the other of said D-type flip-flops has an output providing the delayed separated data signal.

4. In a data processing system having a magnetic storage device and a data recovery system for recovering data stored as a double frequency encoded signal in said magnetic storage device, and a serial-in-parallel-out register for receiving a data signal recovered from the encoded signal in the storage device and being clocked by a clocking signal recovered from the encoded signal in the storage device, the recovered data signal having a data window portion formed by the second half of each bit cycle of the recovered data signal, said data window portion being at a first signal level in order to represent a binary "1" at that bit cycle and at a second signal level in order to represent a binary "0" at that bit cycle, the improvement for assuring proper synchronization of the recovered data signal by the recovered clocking signal when stored in said register, comprising:

circuit means for expanding the data window portion of each bit cycle of the recovered data signal, including flip-flop means for delaying the recovered data signal and logic OR means for logically ORing the recovered data signal with the delayed recovered data signal from the flip-flop means, so that the output of the OR gate means provides a recovered data signal having an expanded data window portion.

5. A data recovery system for recovering data encoded into a double frequency encoded signal, wherein each bit cycle of the encoded signal represents either a binary "1" or a binary "0", comprising:

clock recovery means, including a phase-locked oscillator for providing a separated clock signal from the double frequency encoded signal;

data recovery means, including a data discriminator circuit for providing a separated data signal from the double frequency encoded signal, the separated data signal having a data window formed by the second half of each bit cycle of the separated data signal, with the data window at one of two signal levels in order to represent a "1" at that bit cycle and at the other of the two signal levels in order to represent a "0" at that bit cycle;

a data register clocked by the separated clock signal for receiving and storing data represented by the separated data signal; and a data window expanding circuit for expanding the data window of each bit cycle of the separated data signal for more accurate clocking of said data register to store in said data register the data represented by the separated data signal, said data window expanding circuit including flip-flop means for delaying the separated data signal and logic OR gate means for logically ORing the separated data signal with the delayed separated data signal from said flip-flop means, so that the output of said OR gate means is an expanded separated data signal having an expanded data window that may be clocked by the separated clock signal into said data register.

6. The data recovery system of claim 5, wherein said data discriminator circuit includes a J-K flip-flop clocked by the double frequency encoded signal and having a non-inverted output and an inverted output;

a first D-type flip-flop clocked by the non-inverted output of said J-K flip-flop and reset by the separated clock signal;

a second D-type flip-flop clocked by the inverted output of said J-K flip-flop and reset by the separated clock signal;

an OR gate connected for receiving the outputs of said first and second D-type flip-flops;

a third D-type flip-flop for receiving the output of said OR gate at its data input and clocked by the separated clock signal; and an AND gate for receiving the output of said third D-type flip-flop and the separated clock signal, and providing at its output the separated data signal.

7. A method for improving the accuracy of synchronization of a separated data signal by a separated clocking signal, wherein the separated data signal and the separated clocking signal are recovered from a double frequency encoded signal with the separated data signal having a data window portion for indicating a data value, the data window formed by the second half of each bit cycle of the separated data signal, said method comprising:

delaying the separated data signal by an interval less than one-half of the bit cycle; and logically ORing the separated data signal and the delayed separated data signal in order to provide a separated data signal having an expanded data window portion; and storing the data values represented by the expanded separated data signal in a data register using the separated clocking signal to clock the data register.

* * * * *